July 27, 1926.
F. G. BREYER ET AL
1,594,001
METHOD OF MAKING ZINC SULPHIDE
Filed April 7, 1925
3 Sheets-Sheet 2
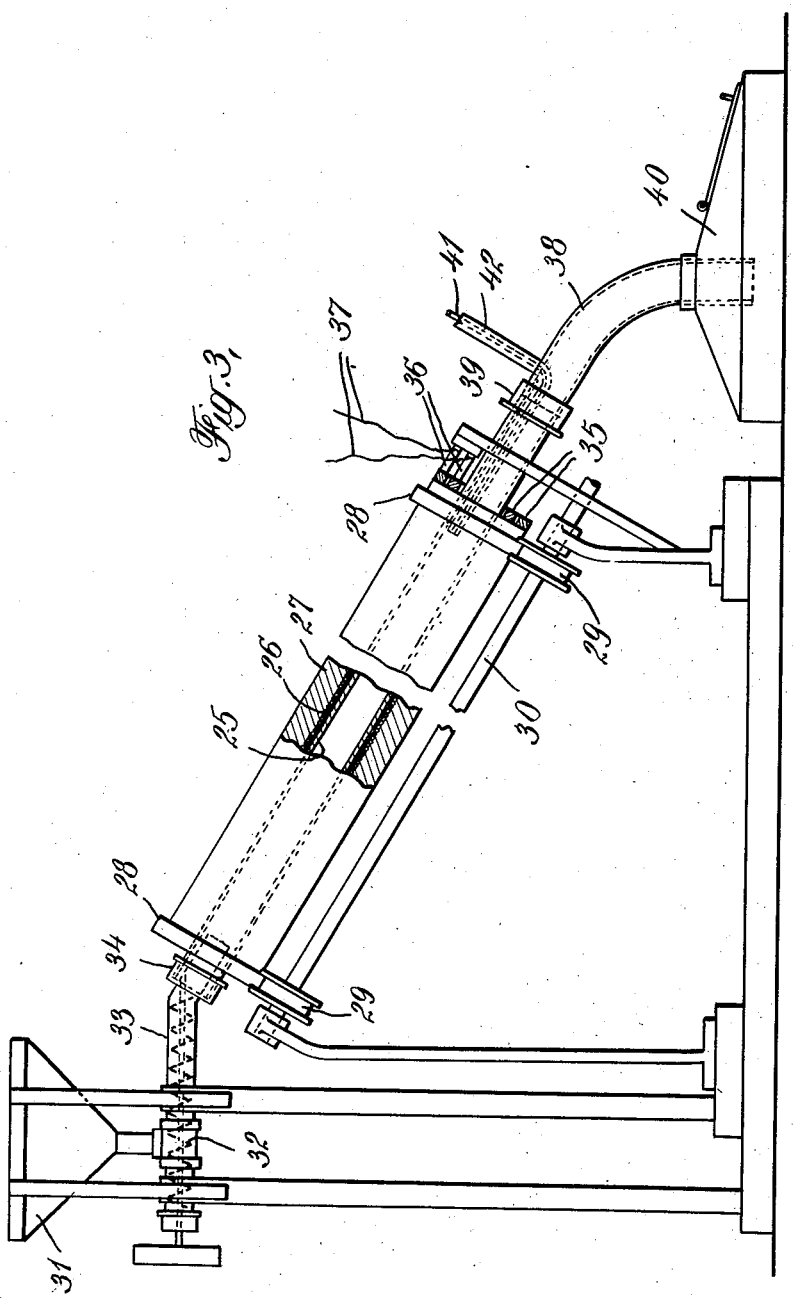
INVENTORS
Frank G. Breyer
Clayton W. Barber
BY
ATTORNEYS July 27, 1926.
F. G. BREYER ET AL
1,594,001
METHOD OF MAKING ZINC SULPHIDE
Filed April 7, 1925   3 Sheets-Sheet 3
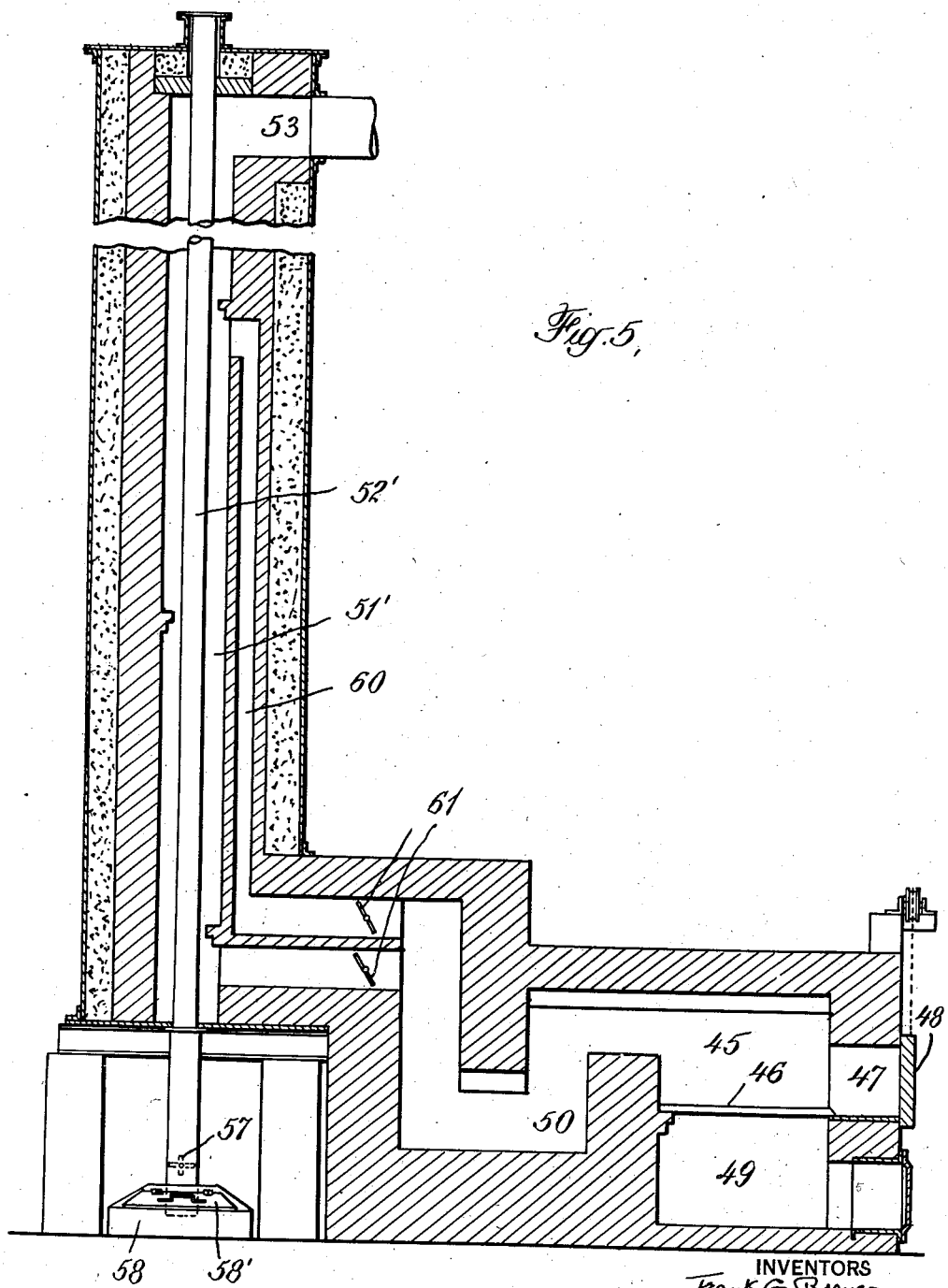

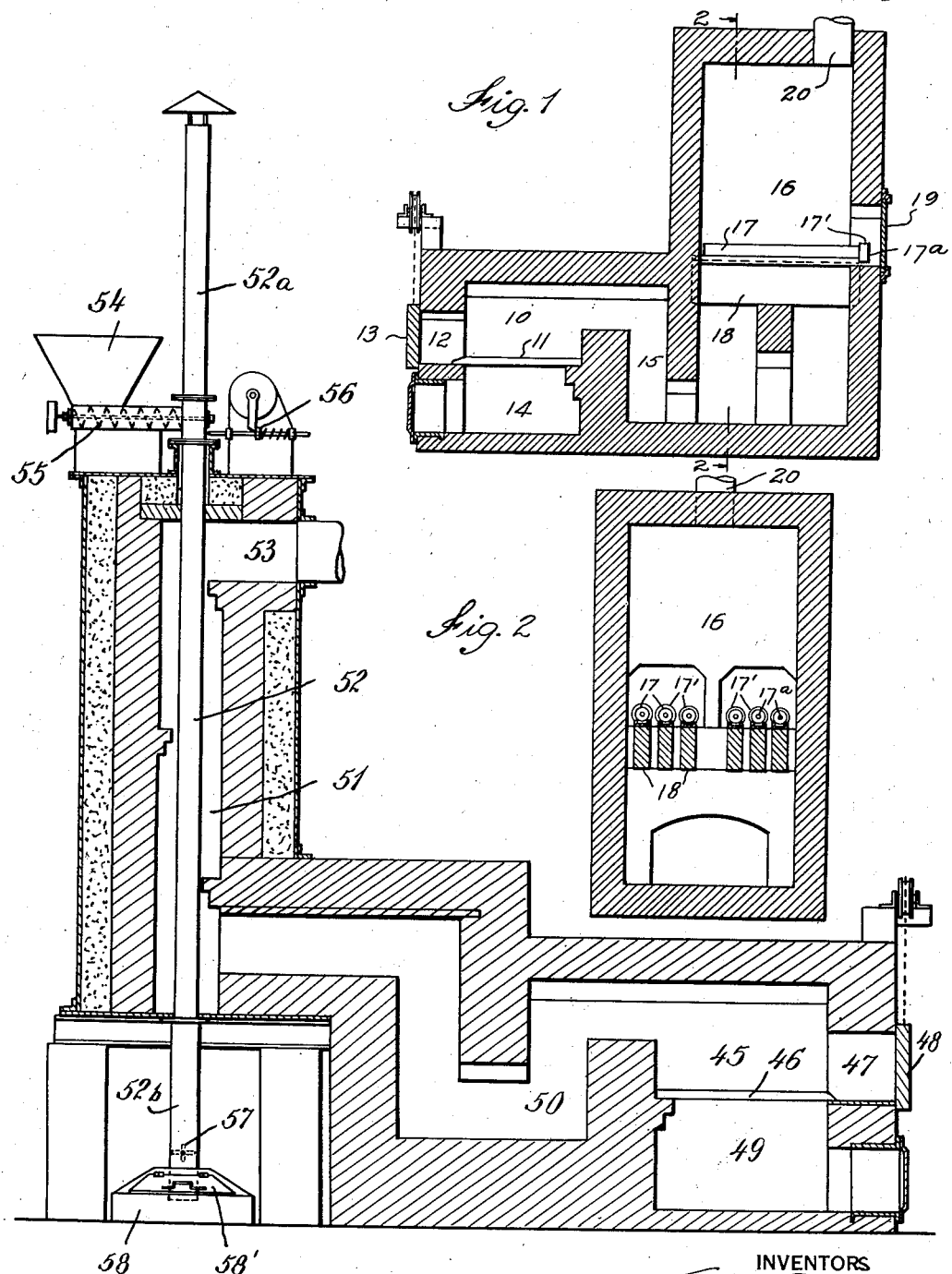

Patented July 27, 1926.

1,594,001

UNITED STATES PATENT OFFICE.

FRANK G. BREYER, OF PALMERTON, AND CLAYTON W. FARBER, OF BOWMANSTOWN, PENNSYLVANIA, ASSIGNORS TO THE NEW JERSEY ZINC COMPANY, OF NEW YORK, N. Y., A CORPORATION OF NEW JERSEY.

METHOD OF MAKING ZINC SULPHIDE.

Application filed April 7, 1925. Serial No. 21,276.

This invention relates to zinc sulphide pigment and has for its object the provision of an improved method of making zinc sulphide in the form of pigment.

When a mixture of zinc oxide pigment and sulphur is heated under non-oxidizing conditions, as for example in a closed vessel, to a temperature in excess of about 400° C., a reaction readily takes place between the zinc oxide and sulphur resulting in the formation of zinc sulphide of appropriate physical characteristics for use as a pigment. The chemical reaction may be represented by the following equation:

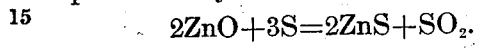

$$2ZnO + 3S = 2ZnS + SO_2.$$

The reaction between the zinc oxide pigment and sulphur begins at a temperature slightly above 100° C. The reaction velocity increases with rise in temperature becoming extremely active at temperatures of 300–400° C., although not sufficiently rapid to effect complete conversion of the zinc oxide to zinc sulphide in a mixture containing approximately the calculated theoretical proportion of zinc oxide and sulphur. This appears to be due in part to loss of sulphur from the charge, the vapor tension of sulphur being high at these temperatures so that considerable sulphur vapor is carried away with the sulphur dioxide gas resulting from the reaction. This deficiency of sulphur in the charge as a result of volatilization may be overcome by using an excess of sulphur in the mixture. Practically complete conversion of the zinc oxide pigment to zinc sulphide pigment can be accomplished at a temperature of 450° C. with a mixture containing 25% more than the calculated proportion of sulphur and a zinc oxide pigment of relatively small particle size. Increase of the temperature to 600° C. and higher correspondingly increases the reaction velocity and gives more consistently high conversion of zinc oxide to zinc sulphide.

The fineness of particle subdivision of the zinc oxide pigment exercises a marked influence on the rapidity with which the reaction proceeds and its degree of completeness. Thus, with the usual grades of American or French processes zinc oxide, whose average particle size is approximately 0.4–0.5 micron, the reaction proceeds relatively much slower than with zinc oxide of an average particle size of 0.25 micron, or less, such as described in the United States patent of Breyer, Gaskill and Singmaster No. 1,522,098, patented January 6th, 1925. With reaction temperatures of from 600°–800° C., rapid and efficient conversion of the zinc oxide pigment to zinc sulphide pigment is effected when using zinc oxide pigment of an average particle size of 0.25 micron or less.

If a zinc sulphide pigment product is desired having the maximum possible whiteness and brightness, it is essential that only extremely pure zinc oxide and sulphur be used. The most satisfactory zinc oxide pigment in this respect is that made from high grade slab zinc. Similarly, resublimed flowers of sulphur should be used. The zinc sulphide pigment made from less pure zinc oxide and sulphur is usually deficient in color and brightness. If these properties of color and brightness are not of the first importance, lower grade raw materials may be used.

The zinc sulphide obtained by heating a mixture of zinc oxide pigment and sulphur, in the manner hereinbefore described, is a yellowish white powder, having no visible crystalline character, even when examined under the highest magnification with the microscope. It has good pigment properties when rubbed down in oil, but its color is more yellow than the better grades of white pigments.

We have discovered that a marked improvement in the color of the zinc sulphide pigment can be brought about by subjecting the raw zinc sulphide, produced as hereinbefore described, to a reheating or remuffling treatment. The exact nature of the change produced by this reheating or remuffling treatment has not been determined. No significant change in the chemical composition of the zinc sulphide pigment takes place, nor is there any apparent change in physical properties, other than the marked improvement in color. The reheating or remuffling treatment should be carried out under non-oxidizing conditions, for example, in an atmosphere of superheated steam or other non-oxidizing or inert gas. The reheating temperature may vary from 600-800° C., very satisfactory results being obtained with a reheating temperature of approximately 700° C.

Our present invention accordingly contemplates an improved method of making zinc sulphide pigment in which a mixture of zinc oxide pigment and sulphur is subjected to a two-stage heat treatment operation in the first stage of which substantially complete conversion of zinc oxide to zinc sulphide is effected and in the second stage of which an improvement in the color of the zinc sulphide is effected. Each stage of the heat treatment operation is conducted under non-oxidizing conditions and preferably at a temperature of 600-800° C. In our present preferred practice of the invention, the two stages of the heat treatment operation are separate and independent steps, and the zinc sulphide product resulting from the first stage is cooled to atmospheric temperature before being subjected to the reheating or remuffling treatment. The raw zinc sulphide product (resulting from the first stage) should be cooled below the oxidation temperature of zinc sulphide (about 450° C.) under non-oxidizing conditions, so as to inhibit during cooling any appreciable oxidation of the zinc sulphide. Similarly the finished zinc sulphide product (from the second stage) should be cooled under conditions inhibiting any appreciable oxidation of the zinc sulphide therein.

The actual practice of the invention will be better understood from the following description representing what we now consider the preferred manner of carrying out the invention.

Zinc oxide (preferably of a particle size of about 0.25 micron or less and carrying less than 0.1% of combined lead, cadmium and iron oxides or other impurities which would yield dark-colored sulphides) is mixed with about three-quarters of its weight of finely divided sulphur (preferably resublimed flowers of sulphur of high purity). This proportion includes an excess of 25% over the chemically equivalent proportion of sulphur, to allow for volatilization losses. The proportions of zinc oxide and sulphur should be such as to supply a sufficient excess of sulphur to compensate for volatilization losses.

The mixing of the zinc oxide and sulphur should be carried out in such a way as to avoid too compact a charge. A satisfactory form of mixer is a rotary screen of the type used for bolting zinc oxide, with a screen of about 14 meshes per lineal inch. Usually two passes through the screen are advisable to insure a reasonably uniform mixture.

Failure to provide a sufficient excess of sulphur or to avoid compacting of the charge during mixing of the zinc oxide and sulphur may result in low conversion of the zinc oxide to zinc sulphide.

The mixed zinc oxide and sulphur is now charged into cylindrical retorts, of steel or other appropriate metal, or of refractory clay, carborundum, silica, or the like. Zinc-coated or galvanized steel retorts 4 inches in internal diameter and 4 feet in length have been used with satisfactory results. The retorts are closed at one end and are fitted with a removable cap at the other end, having a small opening to permit the escape of the sulphur dioxide gas evolved in the reaction. The retorts are completely filled with the mixed zinc oxide and sulphur, but the mixture is not packed under pressure in the retorts.

When the retorts have been filled, they are placed in a furnace and appropriately supported therein. This furnace is preferably maintained at a temperature of from 700 to 800°C. The charge of mixed zinc oxide and sulphur should be heated rapidly to a temperature that will insure complete reaction before volatilization losses have reduced the amount of available sulphur below that chemically equivalent to the zinc oxide to be converted. The temperature should be maintained at the reaction point only long enough to insure complete conversion of the zinc oxide to zinc sulphide. Continuation of the heating may result in re-oxidation of the zinc sulphide unless extreme precautions are taken to exclude air. Excessive temperatures should be avoided as they result in a light sintering together of the particles and the growth of large particles at the expense of small particles. Excessive temperatures also result in the early destruction of the apparatus and contamination of the zinc sulphide by the products of the reactions involved (formation of scale, slags, etc.).

Control of the temperature and of the time of heating permits the control of the particle size of the final zinc sulphide pigment. A short time of heating and low temperature yields fine particle size material, while a long time of heating and high temperature causes the growth of particles and the sintering together of particles and hence a relatively coarse final product.

The retorts are allowed to remain in the furnace until the temperature at the center of the charge has risen to the desired reaction temperature, say approximately 700° C., and the evolution of sulphur dioxide gas has ceased. The retorts are then withdrawn from the furnace and the vent hole in the cap plugged to prevent free access of air, thus inhibiting oxidation of the zinc sulphide during the cooling-down of the product.

The retorts are allowed to cool in the air, until the temperature is below the oxidation temperature of zinc sulphide (about 450° C.). The caps are then removed and the resulting product, consisting for the most part of zinc sulphide, is discharged into suitable containers. This crude zinc-sulphide product is screened through a fine sieve to remove possible bits of scale and iron sulphide, and to mix it thoroughly for sampling. A sample of the product is tested for residual zinc oxide and another sample is rubbed down in oil to determine the hiding power, and if the product is found on-grade in these respects, it is placed in stock for the reheating or remuffling operation. For a high grade product the residual zinc oxide should not be more than 1%.

The crude zinc sulphide product resulting from the first stage heat-treatment operation is now subjected to the second stage heat-treatment operation which is essentially a reheating or remuffling operation. This reheating or remuffling of the crude zinc sulphide product involves subjecting the product under non-oxidizing conditions to a temperature of from 600–800° C., and cooling the thus reheated product under conditions inhibiting any oxidation of the zinc sulphide therein. The operation may be carried out in various ways, and we will now describe certain specific procedures employed by us in actual practice.

According to one procedure, the reheating or remuffling of the crude zinc sulphide product is carried out in an electrically heated furnace having a cylindrical muffle or heating chamber about five inches in diameter and four feet in length. The muffle is filled with the crude zinc sulphide product, and appropriate connections are made to pass a slow stream of superheated steam therethrough. The desired atmosphere of superheated steam within the muffle may be obtained by passing a slow stream of steam through a heated tube maintained at a red heat and thence to the muffle. The muffle is carefully sealed to exclude air and only a small vent is provided for the escape of the superheated steam. The temperature within the muffle is gradually brought up to about 700° C., at which time the heat is cut off and the furnace is allowed to cool slowly, the current of steam, but of approximately lower temperature, being maintained through the muffle. When the temperature has fallen to a point where there is no danger of oxidation upon exposure to air (about 400–450° C.) the muffle is opened and the reheated product withdrawn.

According to another procedure, we utilize a rotary furnace in which the crude zinc sulphide product is passed in a continuous stream through a tubular muffle, externally heated by electric heating coils or other convenient means. The speed of rotation and the angle of inclination of the furnace axis are adjusted to give a suitable rate of passage of the sulphide through the furnace. The crude sulphide is fed in at the upper end from a hopper provided with a screw feed to insure a continuous, regular flow of material. The discharge end of the tubular muffle is connected through an air-tight stuffing box with a receiving hopper having a bottom discharge which is sealed against the entrance of air by the layer of zinc sulphide accumulated above the discharge damper. Steam or other non-oxidizing gas is introduced into the tubular muffle, the flow being regulated to use the minimum amount that will prevent the entrance of air and thus avoid the oxidation. If steam is used, provision is made to maintain the contents of the discharge hopper at a temperature sufficiently high to avoid condensation of the steam. This is accomplished either by covering the exterior of the hopper with a layer of insulation or by surrounding it with heating devices, such as electric resistance units, steam coils, steam jackets, or the like.

In accordance with our preferred procedure, the crude zinc sulphide product is reheated or remuffled in an externally heated vertical muffle. The crude sulphide is fed by gravity from a hopper placed above the top of the muffle tube, and progresses downwardly through the muffle as fast as the finished product is withdrawn from the bottom of the muffle. To avoid danger of bridging and hanging of the charge in the muffle tube, a mechanically operated rapping device is installed near the top of the muffle tube, by means of which the tube is struck at frequent intervals, thus jarring it sufficiently to keep the charge freely moving. Below the heated zone of the muffle tube, which is ordinarily maintained at a temperature from 600–800° C., the tube extends downward in air for several feet to provide a cooling zone in which the temperature of the charge is reduced below the oxidation temperature of zinc sulphide before discharging into the atmosphere. A mechanically operated discharging device is installed at the lower end of the muffled tube and is adjustable to give any desired rate of passage of the material through the tube.

It has been found unnecessary to introduce any steam or other protective atmosphere in the vertical muffle type of apparatus. The moisture absorbed by the crude sulphide while in storage together with the sulphide dioxide gas evolved by the reaction between the small amounts of residual zinc oxide and sulphide provide sufficient protection against oxidation. Furthermore, the fineness of the crude zinc sulphide product prevents any passage of air upward through the charge even though the discharge end of the muffle tube is not sealed air-tight.

The vertical tube muffle may, if desired, be arranged to carry out the two stages of the heat treatment operation characteristic of the present invention. In carrying out the invention in this type of apparatus, the mixture of zinc oxide pigment and sulphur is charged at the top of the muffle tube. The mixture passes downward into a heated zone where the temperature is rapidly raised to a point at which the reaction between the zinc oxide and sulphur readily proceeds. A continuation of the muffle tube above the point of introduction of the charge serves as a stack to carry away the gaseous products of the reaction. If desired, this stack may be connected by suitable flues to a sulphuric acid plant for the recovery of the sulphur dioxide gas. Below the reaction zone of the muffle tube, the charge (now crude zinc sulphide) passes into a second heated zone in which the temperature may be controlled independently of the temperature in the reaction zone. Here the second stage or remuffling operation takes place, and the finished product proceeds downward through a cooling zone and appropriate discharge mechanism.

The invention may be carried out in various types and forms of apparatus. In the accompanying drawings, we have illustrated certain forms of apparatus with which we have successfully practiced the invention. In these drawings—

Figs. 1 and 2 are side and end sectional elevations respectively of an apparatus for carrying out the first stage of the complete method of the invention.

Fig. 3 is a side elevation, partly in section, of an electrically heated rotary muffle or retort for carrying out the second stage of the method of the invention.

Fig. 4 is a sectional elevation of a vertical muffle for carrying out the reheating or remuffling stage of the invention, and Fig. 5 is a sectional elevation of an apparatus of the vertical muffle type for progressively practicing the complete two-stage heat treatment operation characteristic of the invention.

The furnace of Figs. 1 and 2 comprises a fire-box 10 having a grate 11 for supporting the fuel, such as coal or coke, a firing door 12 with a counter-weighted closure 13 therefor, and ash-pit 14. A flue 15 conducts the gaseous products of combustion from the fire box to the retort or muffle chamber 16. The retorts or muffles 17 are zinc-coated steel cylinders about four inches in internal diameter and about four feet long and are permanently closed at one end while the other end is provided with a removable cap 17'. The cap 17' has a vent hole 17a for the escape of the gaseous products of the reaction between the zinc oxide and sulphur. The retorts 17 are supported within the chamber 16 on tiles or piers 18. The chamber 16 has doors 19 through which the retorts are introduced into and withdrawn from the furnace. The exhaust gases escape from the chamber 16 through a stack 20, and may be disposed of in any appropriate manner.

The reheating or remuffling apparatus of Fig. 3 comprises a rotatably mounted retort or muffle 25 surrounded by an electrical heating element 26. The retort may conveniently be a zinc-coated steel tube about four inches in internal diameter and about six feet in length of which about five feet is covered with appropriate heat-insulating material 27. The retort 25 with its heat-insulating cover 27 is provided with rings or tires 28 which are supported upon and adapted to be rotated by grooved rollers 29. The rollers 29, on one side of the retort, are secured to a shaft 30 adapted to be driven from any suitable source of power, whereby the retort is appropriately rotated.

The crude zinc sulphide product is charged into the retort through a hopper 31 and screw conveyor 32. A cylindrical casing 33 encloses the screw conveyor and extends through a stuffing box 34 on the end of the retort, whereby the entrance of air into the retort during the charging of the crude sulphide is effectively avoided.

The ends of the electrical heating element 26 are connected to two electrically insulated slip rings 35 secured to the rotatable retort (or its heat insulating cover) near the discharge end thereof. A pair of spring contacts 36 engage the slip rings 35 and serve to thereby electrically connect the heating element 26 to an appropriate source of electric energy, diagrammatically indicated in Fig. 3 by the cables 37.

The discharge end of the retort 25 is connected to a stationary discharge pipe 38 through a stuffing box 39. The lower end of the pipe 38 terminates in the accumulated discharged sulphide in a covered pan 40, whereby the discharge end of the retort is effectively sealed to avoid the entrance of air.

The retort is mounted at an appropriate inclination to insure the passage of the zinc sulphide therethrough as the retort is rotated. Preferably the inclination of the retort is adjustable, so that desired variations therein may be conveniently obtained.

Superheated steam, or other appropriate inert gas is introduced into the retort through the stationary pipe 41, having an appropriate heat-insulating covering 42. Only sufficient steam is admitted to maintain within the retort a non-oxidizing atmosphere of slightly greater pressure than the external atmosphere.

The reheating or remuffling apparatus of Fig. 4 comprises a fire box 45 having a grate 46, a firing door 47 with a counter-weighted closure 48 therefor, and ash-pit 49. A flue 50 conducts the gaseous products of combustion from the fire-box to the retort or muffle chamber 51. An upright or vertically disposed report or muffle 52 is mounted within the chamber 51. The retort 52 may conveniently be a zinc-coated steel pipe about four inches in internal diameter and about ten feet long. The gaseous products of combustion from the burning fuel on the grate 46 pass through the flue 50 into the chamber 51 and surround the retort 52 and escape from the top of the chamber 51 through an opening 53 to an appropriate stack (not shown).

The retort 52 is provided at its upper end with an extension 52ª. The crude zinc sulphide product is charged into the lower end of the extension 52ª through a hopper 54 and screw conveyor 55. The upper portion of the extension 52ª serves as a stack for the escape of the gaseous products resulting from the reheating or remuffling operation. A rapping mechanism 56 is arranged to periodically strike the extension 52ª for preventing the bridging and hanging of the charge in the muffle tube.

The lower end of the muffle tube 52 communicates with an extension 52ᵇ exposed to the atmosphere below the furnace structure of the muffle chamber. The extension 52ᵇ is provided with a mechanically actuated star-wheel discharge 57. The extension 52ᵇ terminates at its lower end within a covered pan 58 where an effective seal is provided by the accumulation of the discharged sulphide in the pan. The cover of the pan 58 is provided with a hinged portion 58', permitting convenient access to the interior of the pan for leveling the material therein or for removing material therefrom.

The vertical muffle apparatus of Fig. 5 is generally similar in construction to the apparatus of Fig. 4, and corresponding elements are indicated in these two figures of the drawings by the same reference character. The apparatus of Fig. 5 is adapted to progressively carry out the two stages of the heat treatment operation of the present invention, and the vertical retort 52' is accordingly longer than the retort 52 of the apparatus of Fig. 4. The retort 52' may conveniently be a zinc-coated steel tube about nine inches in diameter and about thirty feet long.

The furnace structure of the heating chamber 51' is provided with a flue 60 for conveying a portion of the heating gases from the fire box to a point about midway the ends of the chamber 51'. A portion of the hot gases from the fire box thus enter the lower end of the chamber 51', while another portion of the fire gases enter the chamber 51' at about the middle thereof. Appropriate dampers 61 may be provided for proportioning the relative amounts of the fire gases admitted to the two points of the muffle chamber.

The zinc sulphide product resulting from the two-stage heat treatment operation of our present invention may be subjected to any appropriate subsequent treatment. The subsequent treatment of the zinc sulphide product depends to some extent upon the use to which the zinc sulphide pigment is to be put. The product may, for example, be first screened and then subjected to dry disintegration. Ordinarily, it is our preferred practice to wet grind the zinc sulphide product in a pebble mill to break up aggregates. The ground product is then filtered, dried, and disintegrated.

The zinc sulphide pigment obtained by the practice of our invention (using zinc oxide of an average particle size of 0.25 micron or less as a base) is a white powder having no visible crystalline character even when examined under the highest magnification with the microscope. Its ultimate particles have an average diameter of the order of 0.5 micron. It has strong pigment properties when rubbed down in oil, such as fineness, freedom from grit, and high hiding power or strength. In whiteness and brightness, it is comparable with the best white pigments available. The pigment is essentially pure zinc sulphide containing usually less than 1% of free zinc oxide, and when made from substantially pure starting materials contains only a few hundredths of 1% of lead and iron.

We claim:—

1. The method of making a pigment composed for the most part of zinc sulphide which comprises heating a mixture of zinc oxide pigment and sulphur to a sufficiently high degree to effect the ready formation of zinc sulphide, and subjecting the resulting product to a heat treatment operation under non-oxidizing conditions.

2. The method of making a pigment composed for the most part of zinc sulphide which comprises heating a mixture of zinc oxide pigment and sulphur to a sufficiently high temperature to effect the ready formation of zinc sulphide, subjecting the resulting product to a heat treatment operation under non-oxidizing conditions, and cooling the heat-treated product under conditions inhibiting any appreciable oxidation of the zinc sulphide therein.

3. The method of making a pigment composed for the most part of zinc sulphide which comprises subjecting a mixture of zinc oxide pigment and sulphur to a two-stage heat treatment operation in the first stage of which substantially complete conversion of zinc oxide to zinc sulphide is effected and in the second stage of which an improvement in the color of the zinc sulphide is attained, and cooling the product resulting from the second stage under conditions inhibiting any appreciable oxidation of the zinc sulphide therein.

4. The method of making a pigment composed for the most part of zinc sulphide which comprises subjecting a mixture of zinc oxide pigment and sulphur to a two-stage heat treatment operation under non-oxidizing conditions and at a temperature of 600–800° C., substantially complete conversion of zinc oxide to zinc sulphide being effected in the first stage of said operation and an improvement in the color of the zinc sulphide being attained in the second stage, and cooling the product resulting from the second stage under conditions inhibiting any appreciable oxidation of the zinc sulphide therein.

5. The method of making a pigment composed for the most part of zinc sulphide which comprises subjecting a mixture of zinc oxide pigment of an average particle size not exceeding about 0.25 micron and sulphur to a two-stage heat treatment operation in the first stage of which substantially complete conversion of zinc oxide to zinc sulphide is effected and in the second stage of which an improvement in the color of the zinc sulphide is attained, and cooling the product resulting from the second stage under conditions inhibiting any appreciable oxidation of the zinc sulphide therein.

6. The method of making a pigment composed for the most part of zinc sulphide which comprises subjecting a mixture of zinc oxide pigment of any average particle size not exceeding about 0.25 micron and sulphur to a two-stage heat treatment operation under non-oxidizing conditions and at a temperature of 600–800° C., substantially complete conversion of zinc oxide to zinc sulphide being effected in the first stage of said operation and an improvement in the color of the zinc sulphide being attained in the second stage, and cooling the product resulting from the second stage under conditions inhibiting any appreciable oxidation of the zinc sulphide therein.

7. The method of making a pigment composed for the most part of zinc sulphide which comprises subjecting a mixture of zinc oxide pigment of an average particle size not exceeding about 0.25 micron and sulphur to a two-stage heat treatment operation in the first stage of which substantially complete conversion of zinc oxide to zinc sulphide is effected and in the second stage of which an improvement in the color of the zinc sulphide is attained, cooling the product resulting from the second stage under conditions inhibiting any appreciable oxidation of the zinc sulphide therein, and disintegrating the cooled product and obtaining thereby a zinc sulphide pigment of an average particle size not exceeding about 0.5 micron.

8. The method of making a pigment composed for the most part of zinc sulphide which comprises subjecting a mixture of zinc oxide pigment of an average particle size not exceeding about 0.25 micron and finely divided sulphur to a two-stage heat treatment operation under non-oxidizing conditions and at a temperature of 600–800° C., substantially complete conversion of zinc oxide to zinc sulphide being effected in the first stage of said operation and an improvement in the color of the zinc sulphide being attained in the second stage, cooling the product resulting from the second stage under conditions inhibiting any appreciable oxidation of the zinc sulphide therein, and disintegrating the cooled product and obtaining thereby a zinc sulphide pigment of an average particle size not exceeding about 0.5 micron.

9. The method of making a pigment composed for the most part of zinc sulphide which comprises heating a mixture of zinc oxide pigment of an average particle size not exceeding about 0.25 micron and sulphur to a sufficiently high temperature to effect the ready formation of zinc sulphide, and subjecting the resulting product to a heat treatment operation under non-oxidizing conditions.

10. The method of making a pigment composed for the most part of zinc sulphide which comprises heating a mixture of zinc oxide pigment of an average particle size not exceeding about 0.25 micron and finely divided sulphur to a sufficiently high temperature to effect the ready formation of zinc sulphide, subjecting the resulting product to a heat treatment operation under non-oxidizing conditions, and cooling the heat-treated product under conditions inhibiting any appreciable oxidation of the zinc sulphide therein.

11. The method of making a pigment composed for the most part of zinc sulphide which comprises heating a mixture of zinc oxide pigment and sulphur under non-oxidizing conditions to a temperature of 600–800° C., cooling the resulting product under non-oxidizing conditions to a temperature less than 450° C., then subjecting the resulting product to a reheating treatment under non-oxidizing conditions at a temperature of 600–800° C., cooling the reheated product under conditions inhibiting any appreciable oxidation of the zinc sulphide therein, and distintegrating the cooled product.

12. The method of making a pigment composed for the most part of zinc sulphide which comprises heating a mixture of zinc oxide pigment and sulphur to a sufficiently high degree to effect the ready formation of zinc sulphide, cooling the resulting product under non-oxidizing conditions to a temperature less than 450° C., then subjecting the resulting product to a reheating treatment under non-oxidizing conditions, and cooling the reheated product under conditions inhibiting any appreciable oxidation of the zinc sulphide therein.

13. The method of making a pigment composed for the most part of zinc sulphide which comprises heating a mixture of zinc oxide pigment of an average particle size not exceeding about 0.25 micron and sulphur under non-oxidizing conditions to a temperature of 600–800° C., cooling the resulting product under conditions inhibiting any appreciable oxidation of the zinc sulphide therein, then subjecting the resulting product to a reheating treatment under non-oxidizing conditions at a temperature of 600–800° C., and cooling the reheated product under conditions inhibiting any appreciable oxidation of the zinc sulphide therein.

14. The method of making a pigment composed for the most part of zinc sulphide which comprises heating a mixture of zinc oxide pigment of an average particle size not exceeding about 0.25 micron and finely divided sulphur under non-oxidizing conditions to a temperature of 600–800° C., cooling the resulting product under conditions inhibiting any appreciable oxidation of the zinc sulphide therein, then subjecting the resulting product to a reheating treatment under non-oxidizing conditions at a temperature of 600–800° C., cooling the reheated product under conditions inhibiting any appreciable oxidation of the zinc sulphide therein, and disintegrating the cooled product and obtaining thereby a zinc sulphide pigment of an average particle size not exceeding about 0.5 micron.

15. The improvement in the method of making a pigment composed for the most part of zinc sulphide which comprises subjecting a zinc sulphide product resulting from the interaction of zinc oxide pigment and sulphur to a heat treatment operation under non-oxidizing conditions and at a temperature of 600–800° C., and cooling the resulting product under conditions inhibiting any appreciable oxidation of the zinc sulphide therein.

16. The improvement in the method of making a pigment composed for the most part of zinc sulphide which comprises progressively passing a zinc sulphide product resulting from the interaction of zinc oxide pigment and sulphur through an upright reaction chamber and subjecting the product while passing through the chamber to a sufficiently high temperature to effect an improvement in the color thereof.

17. The improvement in the method of making a pigment composed for the most part of zinc sulphide which comprises subjecting a zinc sulphide product resulting from the interaction of zinc oxide pigment and sulphur to a heat treatment operation under non-oxidizing conditions and at a sufficiently high temperature to effect an improvement in the color of the product, and cooling the thus heat-treated product under conditions inhibiting any appreciable oxidation of the zinc sulphide therein.

18. The improvement in the method of making a pigment composed for the most part of zinc sulphide which comprises progressively passing a zinc sulphide product resulting from the interaction of zinc oxide pigment and sulphur through an upright chamber heated to a temperature of 600–800° C., and in which a non-oxidizing atmosphere is maintained.

19. The improvement in the method of making a pigment composed for the most part of zinc sulphide which comprises progressively passing by gravity a zinc sulphide product resulting from the interaction of zinc oxide pigment and sulphur through an upright chamber heated to a temperature of 600–800° C., and in which a non-oxidizing atmosphere is maintained, progressively discharging the resulting product from the bottom of the chamber, and cooling the resulting product under conditions inhibiting any appreciable oxidation of the zinc sulphide therein.

In testimony whereof we affix our signatures.

FRANK G. BREYER.
CLAYTON W. FARBER.